March 3, 1931. J. H. RAVENS 1,794,922
STRAW SPREADER
Filed June 12, 1928
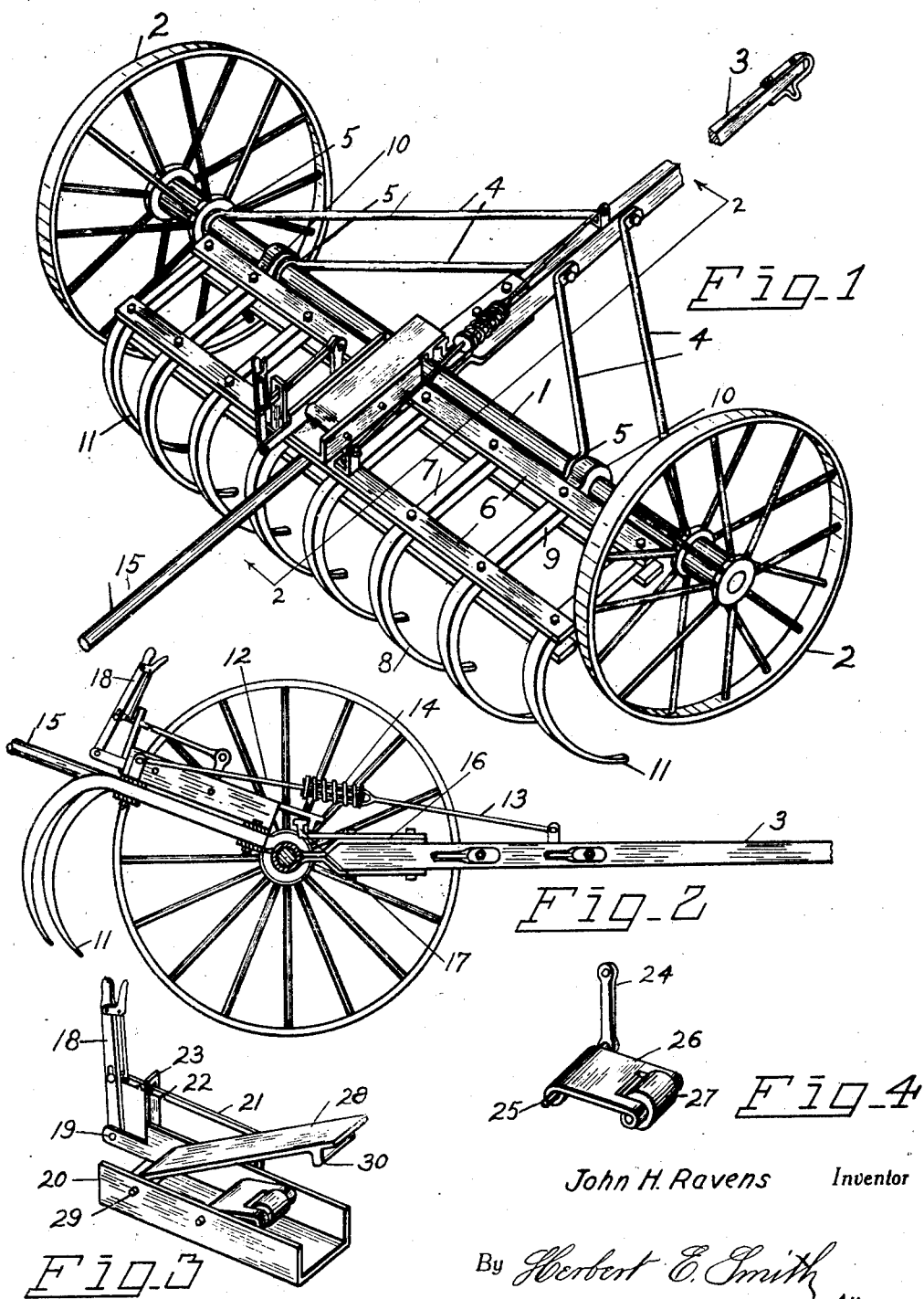
John H. Ravens Inventor
By Herbert E. Smith, Attorney Patented Mar. 3, 1931

1,794,922

UNITED STATES PATENT OFFICE

JOHN H. RAVENS, OF LATAH, WASHINGTON

STRAW SPREADER

Application filed June 12, 1928. Serial No. 284,857.

My present invention relates to an improved straw spreader of the two wheeled type which is designed for use as an agricultural implement especially adapted for gathering and distributing straw and similar materials on the farm. The implement includes a rake which is provided with means for elevating it to inoperative position, and the implement is used for gathering material in piles, as well as for distributing the material from piles or stacks to different points on the farm from which points the material may be spread over the ground.

Means are provided whereby the straw spreader may be manipulated with facility for the performance of its functions, and the implement as constructed according to my invention provides an efficient medium for use upon the farm.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have so far devised for the practical application of the principles of my invention.

Figure 1 is a perspective view of the straw spreader illustrating the rake in operative position. Figure 2 is a sectional view as at line 2—2, showing the rake in elevated or inoperative position. Figure 3 is a perspective view of the device for controlling the rake. Figure 4 is a perspective view of a portion of the control device.

In carrying out my invention I provide a two wheeled implement which may be drawn by horse-power and the implement is provided with an axle 1 and the two traction wheels 2. The single draft tongue 3 is provided for hitching a team of horses, and the draft tongue is equipped with braces 4, 4, which have bearings at 5 on the axle.

At the rear of the axle a transversely extending frame 6 is provided and in this frame are bolted a number of longitudinally extending bars 7 each of which terminates in a curved tooth as 8. Two or more bars as 9 are provided with bearings 10 on the axle and these bearings permit the frame and the rake teeth carried thereby to swing on the axle 1 as a center.

The two end teeth 11 of the rake are preferably in advance of the intermediate teeth in order that the straw or other material being carried by the spreader may be retained and prevented from becoming displaced at the ends of the rake. The rake teeth form a carrier in which a portion of the straw may be gathered from a pile, and these end teeth 11 due to their advance position prevent displacement of this gathered portion from the carrier or rake. The wheeled implement is driven to a pile of straw and while passing over the ground the rake portion is elevated therefrom in order to facilitate movement of the implement. When the straw is to be gathered the rake portion is lowered to the position of Figure 1 and the load is thus gathered from the pile as the implement passes over the pile. The load is displaced from the implement by elevating the rake and then as the implement advances the load is dropped from the rake.

The frame and rake are held in uplifted position by means of an extensible coupling bar which includes a pair of links 12 and 13 pivoted respectively to the frame and to the tongue 3, and these links are connected by a spring device 14 which provides a resilient means of absorbing movements between the frame and tongue. By means of the handle 15 which is attached to the frame and extends to the rear of the implement, the rake may be elevated and the resilient connection 14 assists in facilitating this uplifting movement of the rake.

The rake may be lowered by gravity and its movement is guided by manual operation of the handle bar 15. The rake is locked in uplifted position by co-action means on the frame and the tongue, a lock plate 16 being bolted to the tongue and provided with a lock head 17 located just above the axle of the implement. An operating lever 18 is located at the rear of the frame in position for ready access by the driver of the implement and this lever is pivoted at 19 in a lever frame 20 which is bolted to the top portion of the main frame and extends along the longitudinal center of the implement in line with the tongue 3. A link 21 having notches 22 for co-action with a slotted lock plate 23 on the lever frame, is pivoted to the lever 18 and also pivoted to a crank arm 24. This crank arm has a shaft 25 which is journaled in the lever frame 20 and a crank plate 26 is rigidly secured to the shaft 25 and provided at its free end with a frictional roller 27. This frictional roller is designed to co-act with a latch plate 28 which is pivoted at 29 in the lever frame. On its under side and near its free end the latch plate 28 has a transversely extending lug 30 which fits over the lock head 17 and is designed to hold the rack or carrier frame in uplifted position. In Figure 2 the carrier frame or rack is elevated and the parts are locked.

To lower the rake, the lever 18 is pulled to the rear causing the roller 27 to engage the latch 28 and the latter is released from the lock head 17. Then the rake is lowered by gravity and guided by use of the handle bar 15 and the extensible coupling bar with its spring device retains the rake in operative position.

Having thus fully described my invention, what I claim as new and desire to secure by Letters Patent is:—

The combination in a wheeled implement with its axle and draft tongue, of a transversely extending frame, a plurality of bars secured to said frame and provided with curved teeth, a plurality of said bars having bearings on the axle at opposite sides of the tongue, the two end teeth being arranged in advance of the intermediate teeth, a rearwardly projecting handle bar attached on the frame for use in lifting the latter, means for locking the frame in uplifted position, and means for releasing the locked frame.

In testimony whereof I affix my signature.

JOHN H. RAVENS.